No. 817,669. PATENTED APR. 10, 1906.
C. DE L. RICE.
SHIPPING BOX OR CRATE.
APPLICATION FILED FEB. 25, 1905.

Witnesses:
F. H. Elliott

Inventor:
Charles De L. Rice

UNITED STATES PATENT OFFICE.

CHARLES DE LOS RICE, OF HARTFORD, CONNECTICUT.

SHIPPING BOX OR CRATE.

No. 817,669.      Specification of Letters Patent.      Patented April 10, 1906.

Application filed February 25, 1905. Serial No. 247,350.

*To all whom it may concern:*

Be it known that I, CHARLES DE LOS RICE, a citizen of the United States of America, residing at Hartford, in the county of Hartford and State of Connecticut, have invented certain new and useful Improvements in Shipping Boxes or Crates, of which the following is a specification.

The object of the invention is to provide a means for packing articles in shipping crates or boxes in order to protect them against damage in transit.

It is particularly adapted for packing typewriters, cash-registers, and like instruments, which are of more or less delicate construction and which cannot well be packed in excelsior and like materials.

Figure 1:
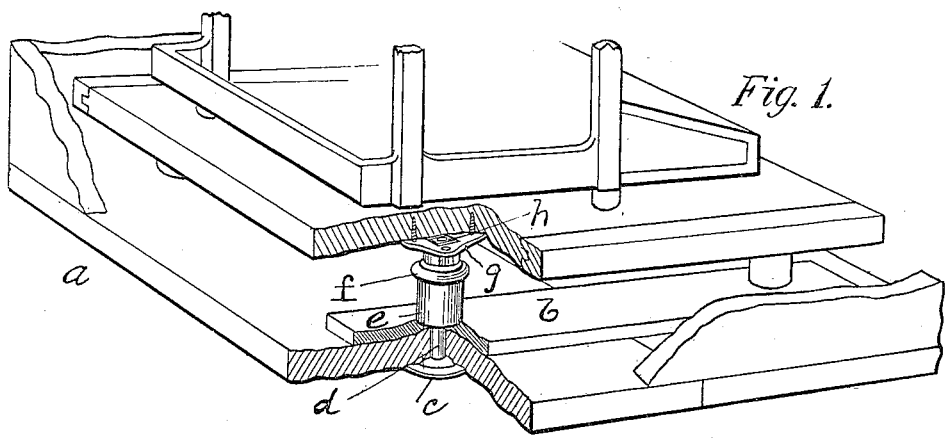
Figure 2:
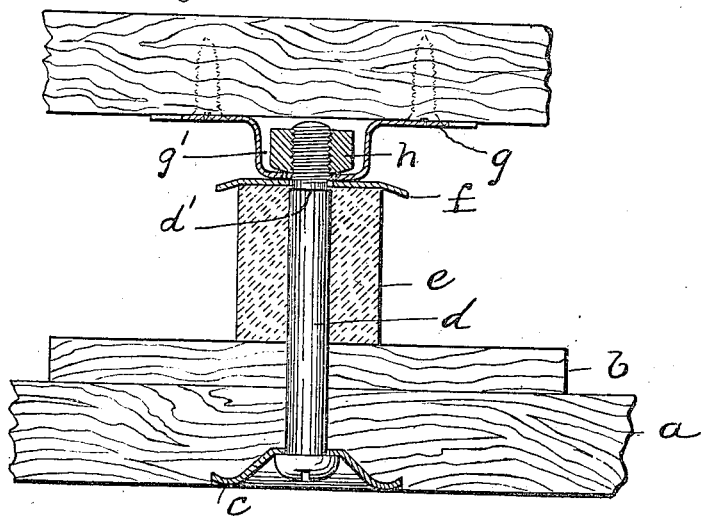
Figure 3:
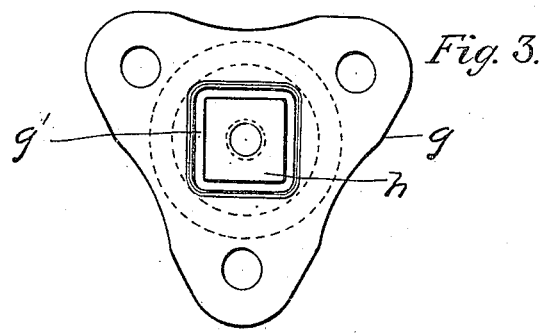

Figure 1 is a perspective view illustrating the manner of use of my invention with parts broken away. Fig. 2 is a central vertical section on enlarged scale. Fig. 3 is a plan view of the recessed plate.

Referring to the drawings, $a$ denotes in general a shipping-box such as is used, for instance, for type-writers. The bottom of the box is reinforced by cleats $b$. It is slightly recessed to take the washer $c$, which receives the head of a bolt $d$, which passes up into the interior of the box. On the bolt is a rubber buffer $e$, surmounted by a dished washer $f$, which tends to prevent the spreading of the buffer. On the bottom of the article is secured the recessed plate $g$, and in the recess $g'$ is located a nut $h$. The bolt $d$ is threaded to fit the nut and has a shoulder $d'$, this shoulder being preferably of even diameter with the thread. The hole through which the bolt passes into this recess to engage the nut is of somewhat larger diameter than the diameter of the bolt, and the nut is smaller than said recess, so that the bolt and nut are free to move from side to side with relation to the recessed plate. The nut is preferably case-hardened to prevent undue wear. The number of these mounting devices used will be determined by the conditions of each case.

A clearance is left between the article and the sides of the box. The bolt fits somewhat loosely in the washer $c$, so that it is free to swing or wabble from side to side. The wood from which these boxes are made is soft enough to give and permit such movement. The rubber buffer serves its purpose as a cushion and also acts as a spacing device.

In shipping type-writers four of these mounting devices are preferably used, one at about each corner of the type-writer base, and the type-writer is attached in no other way to the box. This manner of mounting the machine in its box relieves it from the effects of any severe shock caused by its falling or being dropped, and experience shows that it is extremely efficient in protecting the machine from any serious damage.

I do not wish it to be understood that I limit myself to the details of construction illustrated and described herein. In speaking of the bottom of the box or crate it is to be understood that that part of the box to which the article is secured is meant. It will also be apparent that for some purposes it might be advisable to support an article from two sides and leave clearance on the other four sides, and I do not wish to be understood as limiting myself to any particular manner of use of the device.

I claim as my invention—

1. The herein-described means for shipping heavy delicate articles which consists in providing a shipping box or crate larger as to its inside dimensions than the outside dimensions of the article whereby a clearance is provided on all sides of the article, bolts passing through a wall of the box, with their heads lying against the outer side of said wall, into the interior thereof and secured to the article located therein, elastic spacing devices located between the wall of the box through which the bolts pass and the article within the box, so that the article is held free from all sides of said box or crate, said bolts having yielding connection with the box-wall and the article to permit free movement of the latter in all directions independently of the former, substantially as described and for the purposes set forth.

2. The herein-described means for shipping heavy and delicate articles which consists in providing a shipping box or crate larger as to its inside dimensions than the outside dimensions of the article whereby a clearance is provided on all sides of the article, bolts passing through a wall of the box into the interior thereof and secured to the article located therein to hold it free from all sides of said box or crate, said bolts having yielding connection with the box-wall and the article to permit free movement of the latter in all directions independently of the former, and elastic buffers surrounding said bolts and interposed between the article and the wall of the box, substantially as described and for the purposes set forth.

3. The combination with the box and the article to be shipped located therein, of washers located in recesses in the bottom of the box, bolts passing freely through said washers into the interior of the box, elastic buffers surrounding said bolts, recessed plates secured to the bottom of said article, and nuts loosely mounted in said recesses and adapted to be engaged by said bolts, substantially as described and for the purposes set forth.

4. The combination with the box and the article to be shipped located therein, of washers located in recesses in the bottom of the box, bolts passing freely through said washers into the interior of the box, elastic buffers surrounding said bolts, dished washers located on said bolts over said buffers, recessed plates secured to the bottom of said article, and nuts loosely mounted in said recesses and adapted to be engaged by said bolts, substantially as described and for the purposes set forth.

In testimony whereof I affix my signature in presence of two witnesses.

CHARLES DE LOS RICE.

Witnesses:
GEO. B. WARD,
H. E. HART.